United States Patent [19]
Weaver

[11] Patent Number: 4,783,879
[45] Date of Patent: Nov. 15, 1988

[54] ROLLER ASSEMBLY FOR SUPPORTING HOUSEHOLD APPLIANCES

[75] Inventor: Douglas E. Weaver, Greenville, Mich.

[73] Assignee: White Consolidated Industries, Inc., Cleveland, Ohio

[21] Appl. No.: 142,509

[22] Filed: Jan. 11, 1988

[51] Int. Cl.$^4$ .............................................. B60B 33/06
[52] U.S. Cl. ........................................... 16/34; 16/19; 280/43.2; 280/43.24; 312/250
[58] Field of Search ............... 16/19, 32, 34; 312/250; 280/43.2, 43.24

[56] References Cited

U.S. PATENT DOCUMENTS

| | | | |
|---|---|---|---|
| 2,643,894 | 6/1953 | Schroeder | 280/43.2 |
| 3,432,878 | 3/1969 | Hupfer | 16/32 |
| 3,437,346 | 4/1969 | Cobb | 280/43.2 |
| 3,534,430 | 10/1970 | Kesling et al. | 16/34 |
| 3,844,578 | 10/1974 | Matyskella et al. | 280/43.24 |
| 3,858,270 | 1/1975 | Crowe | 16/19 |

Primary Examiner—Nicholas P. Godici
Assistant Examiner—Richard K. Seidel
Attorney, Agent, or Firm—Pearne, Gordon, McCoy & Granger

[57] ABSTRACT

A supporting roller assembly for a household appliance includes a fixed rear roller and a height-adjustable front roller. The front roller has a frame for mounting against a flat surface on the underside of the appliance, together with a vertically extending front wall at the front of the appliance mounting the head of an adjustment screw. The roller is carried on a roller carrier which is pivotally mounted on the frame member and carries a captive nut engaging the screw so that rotation of the screw causes the roller carrier to rotate about its pivotal engagement to raise and lower the front end of the appliance. The fixed rear roller assembly has a frame which snaps into an opening in a bottom wall of the appliance. The bottom wall has upwardly projecting flanges which overlay a press-in axle carried by the roller frame and journaling the roller and the flanges prevent any lengthwise movement of the axle which would cause it to disengage from the ears on the frame.

11 Claims, 2 Drawing Sheets

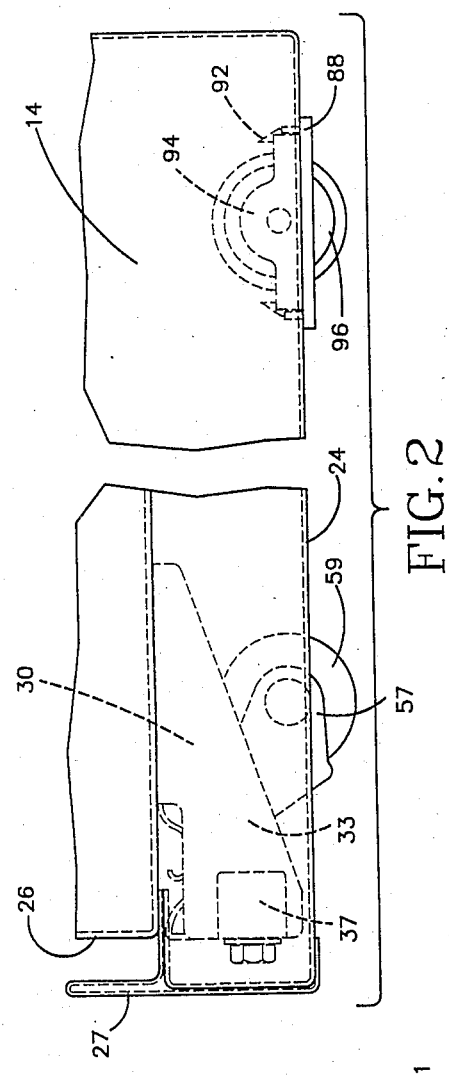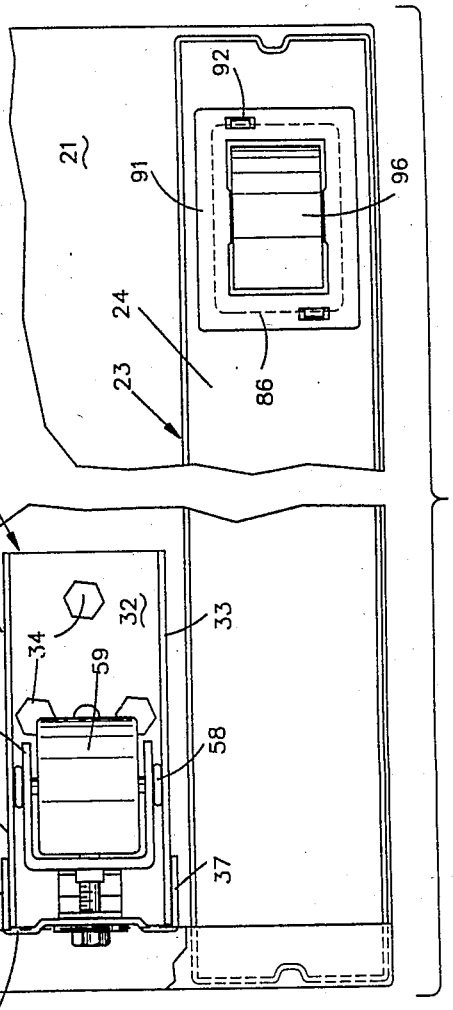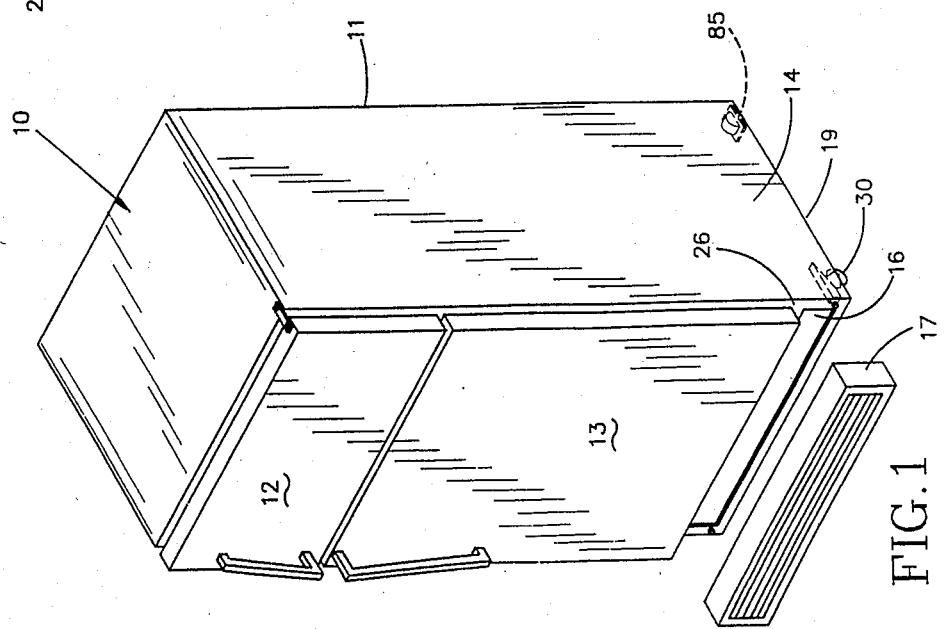

ROLLER ASSEMBLY FOR SUPPORTING HOUSEHOLD APPLIANCES

BACKGROUND OF THE INVENTION

This invention relates generally to a roller or caster assemblies, and more particularly to such assemblies including height-adjustable rollers particularly adapted for use with heavy household appliances, such as refrigerators and food freezers.

While refrigerators and food freezers are generally located in a portion of the house where the floors are relatively level, it is still necessary to provide a leveling device at each of the front edges of the appliance to ensure precise leveling and ensure that the doors will properly open and close. In their simplest form, such leveling devices may be adjustable legs that make a threaded engagement with a nut on the refrigerator and have a flat pad for engaging the floor. While such devices enable a refrigerator to be leveled, they make it difficult to move when it is desired to clean either the floor beneath the refrigerator, the wall behind it, or, in some cases, condenser coils that may be mounted along the rear wall of the refrigerator.

To allow easy movement of a refrigerator, it has been proposed to provide rollers at each of the front corners of the refrigerator and, optionally for easier movement, rollers at each of the rear corners. While the rear rollers may be fixed in place, the front rollers must be vertically adjustable for leveling purposes. Furthermore, adjustable height front rollers may also be used in combination with threaded adjustable legs where the friction provided by such legs is desirable to prevent movement when the refrigerator is in place. In such case, the adjustable rollers may be retracted when the refrigerator is in place, and then adjusted downwardly to lift the refrigerator off the threaded legs to allow movement. After the refrigerator is back in place, they can be retracted to permit proper positioning on the preadjusted threaded legs.

Roller arrangements that have been used heretofore may perform adequately when the refrigerator is in place in the home, but from the manufacturing point of view may suffer such shortcomings as high cost of manufacture and labor-intensive installation. Some versions also may require assembly prior to the finished assembly of the appliance, and therefore cannot be used as a dealer-installed option.

Other problems that occur with some of the prior art devices are difficulty of adjustment in the home, as well as the use of sliding surfaces which may suffer from greatly increased friction as the result of an accumulation of dust and dirt.

One example of such a structure is shown in U.S. Letters Patent to W. R. Cobb U.S. Pat. No. 3,437,346, granted Apr. 8, 1969, which shows a rear roller structure in which the roller is mounted on a pin inserted in bent-up tabs on the refrigerator bottom, while the front adjustable roller consists of a roller carrier mounted on vertical flanges on a frame fastened to the refrigerator and a vertically extending screw moves the roller carrier vertically for purposes of adjustment.

U.S. patent to K. K. Kesling et al. U.S. Pat. No. 3,534,430, granted Oct. 20, 1970, shows a fixed roller mounted in the housing attached to the bottom side of the side rails at the rear of the refrigerator and a rocking-type front roller mounted on a roller carrier in the form of a bell crank pivoted at one end to a housing attached at the bottom of the refrigerator while the upper end is moved by a threaded bolt arrangement having a long extension to the front of the refrigerator.

U.S. patent of John X. Matsykella et al. U.S. Pat. No. 3,844,578, granted Oct. 29, 1974, uses a vertically extending screw fixed in the refrigerator frame with a head projecting below the lower surface to receive a wrench for rotating the screw. The roller is mounted on a carrier, which makes threaded engagement with the screw while having projecting arms engaging the frame to prevent rotation of the roller frame.

U.S. patent to William P. Crowe U.S. Pat. No. 3,858,270, granted Jan. 7, 1975, requires the frame of the refrigerator to have a cross rail with a vertical surface joined at its upper end to a horizontal surface into which is threaded a vertical adjustment screw. Bolts hold a guide to the rear of the vertical surface to provide ways on which a rollersupport can be guided, while the support at its end engages the adjusting screw so that rotation of the adjusting screw moves the roller support vertically with respect to the frame cross member.

SUMMARY OF THE INVENTION

This invention provides an improved roller ssembly for appliance cabinets of the type used for refrigerators and food freezers. The front roller assembly is a simple, low-cost, self-contained unit which does not require any modification or alteration of any of the base structure components of the appliance for its installation. All that is required for ease of installation is to provide pre-punched holes to accept self-tapping sheet metal screws, so that the roller assembly may be secured to the refrigerator structure at any point, such as on the cabinet bottom, which may be relatively thin sheet metal providing an outer covering for the insulating foam.

The roller assembly includes a frame member having a top wall with apertures through which sheet metal screws may pass to secure the frame to the bottom wall of the appliance. The frame includes a pair of downwardly extending side walls and a front wall to be located adjacent the front of the appliance and which is secured by overlapping tabs welded to the side walls to provide a rigid box structure. The frame also has a slot on the top wall adjacent the front wall, and the area around the slot is depressed to allow clearance from the refrigerator casing. A roller carrier has a hooked portion at its upper end engaged in the slot, so that this connection may act as a pivot for the roller carrier, which has both a front wall and a pair of rearwardly extending side walls, each of which at its upper end adjacent the hooked portion has a pair of ears to engage the underside of the frame top wall to provide a pivot-like or rocking bearing. The roller carrier at its lower end has an axle extending between the side walls on which the roller itself is journaled.

Movement of the roller carrier in its pivotal motion about the slot on the frame is accomplished by means of a screw and nut arrangement in which the head of the screw is mounted on the outer side of the front wall of the frame and extends through an opening in the roller carrier where it engages a nut member having a pair of extending ears on each side which are secured in openings in the side walls of the carrier. Thus, rotation of the screw causes the roller carrier to rotate about its upper end and, as it moves toward the frame front wall, the lower end of the carrier rotates downward to move the roller downwardly and away from the frame top wall, to thereby raise the appliance. A light U-shaped spring, with elongated apertures which fit over the screw, is interposed between the front face of the roller carrier and the front wall of the frame to provide a biasing action to rotate the roller carrier toward an upward position so that the roller can be positively retracted when it is not in a load-bearing condition.

A simplified rear roller assembly is also provided to fit in a rectangular cutout on the bottom face of a frame side rail. When the cutout is formed, flanges are formed on each of the rectangular walls and extend upwardly from the bottom face. A roller carrier, in the form of a rectangular frame, has upwardly extending ears with apertures to receive an axle pin which is pressed in place and journals the roller thereon. These ears extend parallel to the longer side of the opening, while each of the shorter sides of the carrier has a flexible detent arm, and a peripheral surface around the carrier engages the lower side of the frame rail. When the unit is pressed in place in the opening, the detent arms at each end of the carrier snap over the flanges on the short side of the opening, while the flanges on the longer sides of the opening extend upwardly to a point above the lower point of the axle to retain the axle in place in the carrier against longitudinal movement.

BRIEF DESCRIPTION OF THE DRAWINGS

FIG. 1 is a perspective view of a refrigerator, showing in phantom the mounting of the front and rear rollers according to the preferred embodiment of this invention;

FIG. 2 is an enlarged, fragmentary side elevational view of the bottom of the refrigerator of FIG. 1, showing the front and rear rollers;

FIG. 3 is a fragmentary bottom plan view of the portion of the refrigerator shown in FIG. 2;

DETAILED DESCRIPTION OF THE PREFERRED EMBODIMENT

Figure 4:
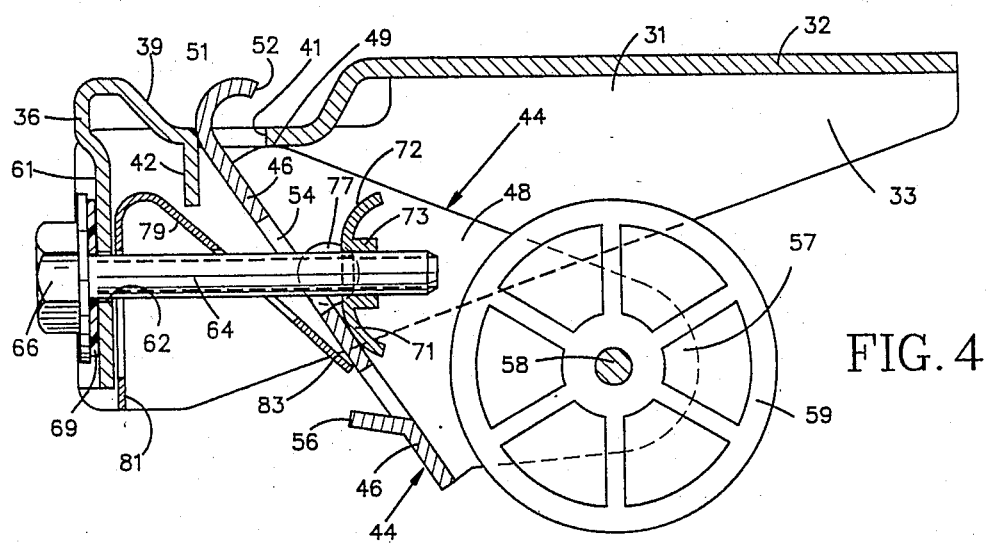
FIG. 4 is an enlarged, cross-sectional view of the adjustable front roller, showing the roller in the raised position.

Referring now to the drawings in greater detail, FIG. 1 shows, by way of example, a refrigerator 10 having a cabinet 11 having a top freezer door 12 and a food compartment door 13 on the front face. The cabinet 11 is of generally rectilinear shape, and includes outer side walls 14, as well as an air flow space 16 beneath the cabinet, and this air flow space 16 is closed off normally by a grille member 17 which is attached to the cabinet 11 in such a manner as to allow it to be easily movable for cleaning purposes.

As best shown in FIGS. 2 and 3, the cabinet 11 includes a bottom wall 21 extending across the underside, and also forming the outer surface for the foam insulation space above it and forming the upper wall for the air flow space 16. This bottom wall 21 is normally formed of sheet metal, and may be relatively thin, in the range of 0.015–0.030 inch, since in modern cabinets, much of the rigidity is provided by the foam insulation.

To provide greater rigidity and proper support for the refrigerator, the cabinet 11 has a side rail 23 extending along the lower edge of the side wall 14 from the front to the back of the cabinet. The side rail 23, in turn, has a bottom wall 24 upon which the refrigerator would be supported in the absence of the rollers or other similar structure. A side rail 23 may extend beyond the front face 26 of cabinet 11 a short distance to mount an end cap 27 which, in turn, may also provide a mount for the griller 17. It will be understood that the above description of the refrigerator is by way of example only to provide background for the further description of the invention and, in itself, forms no part of the present invention.

The front roller assembly 30 is preferably positioned inwardly of the side rail 23, so that it may be attached directly to the cabinet bottom wall 21. Thus, the roller assembly 30 is completely independent of the structure of the side rail 23 or other components of the refrigerator cabinet, so that it may either be installed as an option or left off, as would be the case of lower cost units. The roller assembly 30 includes a frame 31 having a top wall 32 and a pair of triangle-shaped, downwardly extending integral side walls 33. The top wall 32 is provided with suitable openings (not shown) through which screws 34 may pass to secure the top wall 32 directly to the cabinet bottom wall 21. The screws 34 may engage either the metal of the bottom wall 21 by extending through prepunched openings or, if additional strength is required for larger refrigerators, sheet metal nuts mounted within the foam space in the manner well known in the art.

The frame 31 also includes a front wall 36 positioned adjacent the cabinet front face 26 and extending integrally down from the top wall 32. The front wall 36 is preferably provided with ears 37 which are bent back along the outer sides of the side walls 33 and welded in place to provide a rigid, boxlike structure for the frame 31. A recessed portion 39 is provided on the top wall 32 a spaced distance from the front wall 36 to provide a clearance space from the refrigerator bottom wall 21, and a transverse slot 41 is formed in the recess 39 and includes a downwardly extending tab 42 along the side of slot 41 adjacent the front wall 36.

Figure 5:
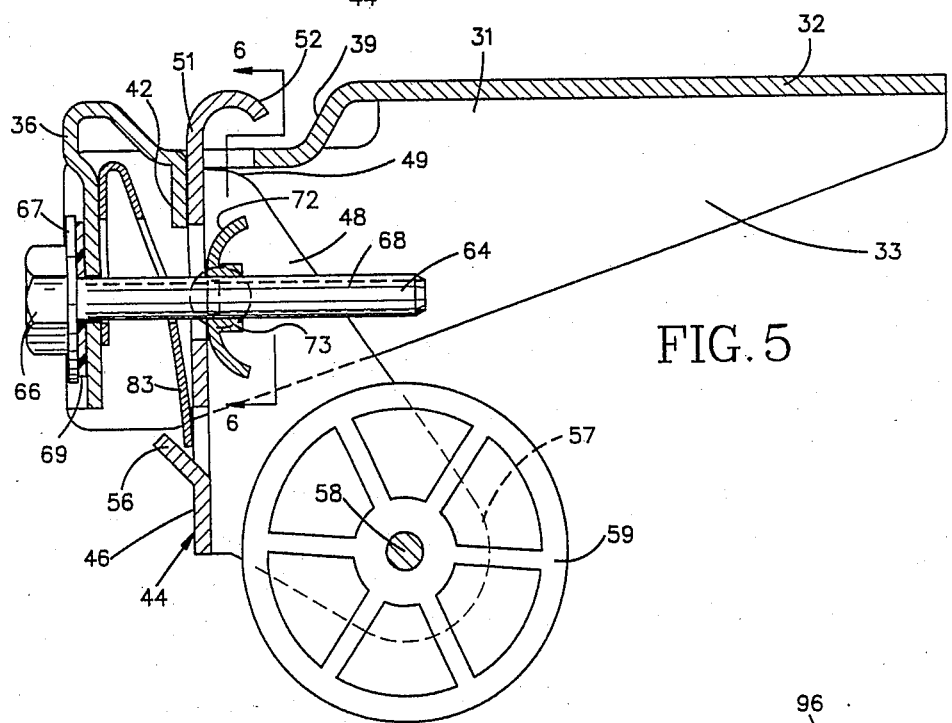
FIG. 5 is a cross-sectional view, similar to FIG. 4, but showing the roller in the lowered or fully elevated position.
Figure 6:
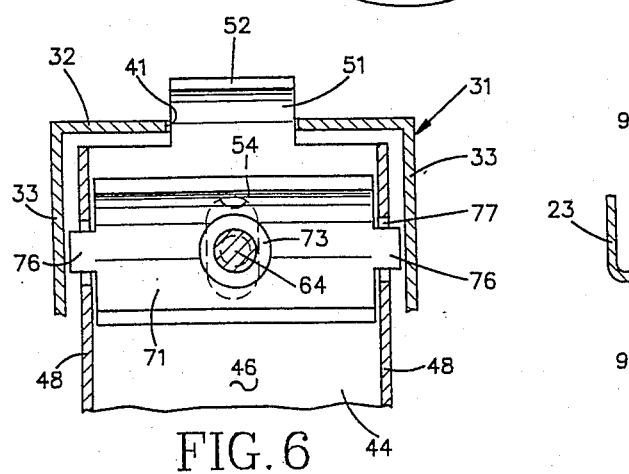
FIG. 6 is a fragmentary, cross-sectional view, taken on line 6—6 of FIG. 5.

The roller carrier 44 is also channelshaped, having a front wall 46 and a pair of rearwardly extending side walls 48, and has an overall width substantially less than the spacing between the frame side walls 33. The side walls 48, at their upper ends, are formed with shoulders 49 which are adapted to engage the bottom wall of recess 39 to support the frame 31, and hence the weight of the front end of the refrigerator 10. The front wall 46 has an upwardly extending tongue 51 which extends through the slot 41 and is provided with a curved end 52, which retains the roller carrier 44 within the slot 41 whenever the carrier is near the vertical position as shown in FIG. 5. At its midpoint, the front wall 46 also has a screw receiving opening 54, as well as a projecting tab 56 adjacent its lower end, for reasons explained in greater detail hereinafter.

The roller carrier side walls 48 terminate at their lower ends in ears 57, which extend in parallel fashion to receive a suitable axle 58 on which the roller 59 is journaled for free rotation. As seen most clearly from FIGS. 4 and 5, the roller carrier 44 is therefore able to rotate with a pivotlike or rocking action about the contact between the shoulders 49 and the underside of the recess 39 to provide a pivotal action so that as the roller carrier 44 is rotated from the position in FIG. 4 toward the position in FIG. 5, the position of the roller 59 is lowered with respect to the frame 31. Thus, when the refrigerator is positioned with the roller 59 in contact with a floor surface to support the weight of the refrigerator, such movement tends to raise the refrigerator at the front end and rotate it about the rear roller assembly. Likewise, movement in the opposite direction will tend to lower the front end of the refrigerator in a similar manner.

The frame front wall 36 is provided with a locating recess 61 on its front surface extending around a screw-receiving opening 62. A suitable screw 64, having a hex head 66 or other means to allow driving rotation, is provided with a captive washer 67 extending around its threaded shank 68, and a suitable plastic thrust washer 69 is positioned between the washer 67 and the front face 36 to minimize friction therebetween. The threaded shank 68 extends rearwardly from the front face 36 to pass through the opening 54 on the front face of roller carrier 44 and make threaded engagement with a nut member 71 having a threaded lance portion 73 at its midpoint. The nut 71 is captive in the roller carrier 44, and is formed with a curved wall 72 adapted to make engagement with the rear face of the front wall 46 when the screw 64 is in tension when the refrigerator load is on the roller 59. To hold the nut 71 in place and prevent its rotation about the screw axis, the nut 71 has a pair of transversely projecting ears 76 on its opposite side which fit through circular openings 77 on the side walls 48 immediately adjacent the front wall 46 and allow the nut 71 to rotate about a transverse axis and maintain the curved wall 72 in engagement with the roller carrier at different angular positions.

When the refrigerator is at rest on the floor, the roller assembly may take the position shown in FIGS. 4 or 5, or any intermediate position, depending upon the relation of the screw 64 and nut 71. It will be seen that rotating the screw 64 in one direction will move the roller from the position of FIG. 4 toward the position of FIG. 5, and thereby raise the refrigerator. Likewise, rotation of screw 64 in the opposite direction will tend to move the roller from the position of FIG. 5 back toward that of FIG. 4, assuming that the weight of the refrigerator causes such movement. If there is no weight on the roller assembly, the force of gravity tends to move the roller to the position of FIG. 5, and may in fact force the screw head 66 outwardly away from the front wall 36 of frame 31. Normally, this is no problem, but if the refrigerator is being moved, as may occur in packing, it is desirable to have the roller near the position shown in FIG. 4. To accomplish that when there is no load on the roller, a U-spring 79 is positioned between the rear face of front wall 36 and the front side of roller carrier front wall 46. The U-spring 79 is formed with an apertured front leaf 81 to engage the front wall 36 and an apertured rear leaf 83 engaging the roller carrier wall 46. The U-spring 79 is held in place by means of the apertures which receive the threaded shank 68, and this spring may be made of any suitable material since it has to counterbalance only the weight of the roller carrier and the roller. To further ensure that the U-spring 79 will remain in its proper position, the lower end of rear leaf 83 may engage the tab 56 to hold it in the proper position.

Figure 7:
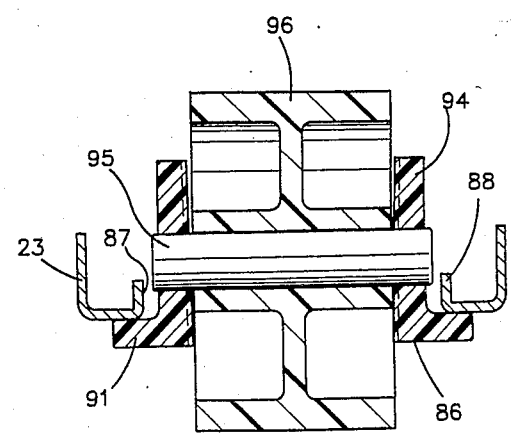
FIG. 7 is a transverse, cross-sectional view of the rear roller assembly.

The rear roller assembly is best shown in FIGS. 2, 3, and 7. The rear roller assembly 85 includes a generally rectangular frame 86 which is adapted to fit within a rectangular opening 87 in the bottom wall 24 of side rail 23. The opening 87 is formed with upstanding flanges 88 around the four sides, and these can be formed by bending when the aperture is punched into the side rail during manufacture. To hold the frame 86 in place against upward movement, it has on all four sides an outwardly extending flange 91 which is adapted to abut against the bottom face of bottom wall 24 when in position. The frame 86 is held in place against downward movement by several retaining tabs 96 which are formed into the frame on the narrower front and back sides. When the frame 86 is pressed into opening 87, the tabs 92 will snap over the top of the adjacent flanges 88 with a snap detent action to hold the frame in place.

Along the longer extending sides, the frame 86 is provided with upwardly projecting ears 94 which are apertured to receive a cylindrical axle 95 on which the roller 96 is journaled for free rotation. While the axle 95 may be made a press fit within the openings in ears 94, it is contemplated that the frame 86 is most easily fabricated by molding from a suitable plastic material, and it is recognized that the axle 95, preferably formed of metal, may have a tendency to move axially in either direction under continued rotation of the roller 96. To prevent that, the axle 95 is so positioned that at least a portion at the end falls below and is in opposing alignment with the upper sides of the adjacent flanges 88 formed on the side rail bottom wall 24, and these flanges 88 thereby serve to restrain the axle 95 to limit any endwise movement that might cause it to disengage from the apertures in the ears 94.

Although the preferred embodiment of this invention has been shown and described in detail, it is recognized that various modifications and rearrangements may be made without departing from the scope of the invention as defined in the following claims.

What is claimed is:

1. An adjustable roller assembly for mounting on the underside of a household appliance, comprising:
   a frame having a top wall securable to the appliance, said frame having a downwardly extending front wall;
   a roller carrier including a center section having first and second ends, said first end being pivotally connected to said frame top wall at a point a spaced distance from said frame front wall;
   a roller secured to said roller carrier adjacent said second end; and
   threaded means interconnecting said frame front wall and said roller carrier at a point intermediate said first and second ends so that said threaded means operates to rotate said roller and roller carrier about said pivotal connection and thereby raise or lower said appliance.

2. An adjustable roller assembly as set forth in claim 1, wherein said pivotal connection includes a slot on said frame top wall and a tongue on said roller carrier engaged in said slot.

3. An adjustable roller assembly as set forth in claim 2, wherein said roller carrier has parallel side walls integral with said center section and said side walls each have a shoulder at said first end engaging said frame top wall adjacent said slot.

4. An adjustable roller assembly as set forth in claim 3, wherein said roller is journaled on an axle mounted on said roller carrier side walls.

5. An adjustable roller assembly as set forth in claim 1, wherein said threaded means comprises a screw carried on said frame front wall and a nut carried by said roller carrier.

6. A roller assembly as set forth in claim 5, wherein said nut has a curved wall engaging said roller carrier.

7. A roller assembly as set forth in claim 6, wherein said nut is held captive in said roller carrier.

8. A roller assembly as set forth in claim 7, wherein said nut has transversely projecting ears and said roller carrier has parallel side walls defining openings receiving said ears to permit said nut to rotate about an axis passing through said ears.

9. A roller assembly as set forth in claim 5, including spring means biasing said roller carrier away from said front wall.

10. A roller assembly for an appliance having a bottom wall defining a rectangular opening, said wall having upwardly extending flanges along each side of said opening, said roller assembly including a rectangular frame mounted in said opening, an outwardly extending flange on said frame in abutting engagement with said bottom wall, said frame having upwardly extending ears on one pair of opposite sides, each of said ears having an opening, an axle received in said openings, a roller journaled on said axle, said openings and said axle having at least a portion in opposing alignment with the adjacent wall flange so that said wall flange limits endwise movement of said axle to retain said axle within said openings.

11. A roller assembly as set forth in claim 10, including retaining tabs on said other pair of opposite frame sides and engageable with the adjacent wall flanges to retain said frame in said rectangular opening

* * * * *